(12) United States Patent
Wang et al.

(10) Patent No.: US 11,852,541 B2
(45) Date of Patent: Dec. 26, 2023

(54) TEMPERATURE MEASUREMENT METHOD, TEMPERATURE MEASUREMENT PROBE, AND TEMPERATURE MEASUREMENT DEVICE

(71) Applicant: XIAMEN KAIYUN INFORMATION TECHNOLOGY CO., LTD., Xiamen (CN)

(72) Inventors: Peiyong Wang, Xiamen (CN); Xingyou Li, Xiamen (CN); Qinghuang Huang, Xiamen (CN)

(73) Assignee: XIAMEN KAIYUN INFORMATION TECHNOLOGY CO., LTD., Xiamen (CN)

( * ) Notice: Subject to any disclaimer, the term of this patent is extended or adjusted under 35 U.S.C. 154(b) by 93 days.

(21) Appl. No.: 17/544,949

(22) Filed: Dec. 8, 2021

(65) Prior Publication Data
US 2022/0316962 A1 Oct. 6, 2022

(30) Foreign Application Priority Data
Mar. 30, 2021 (CN) .......................... 202110344256.4

(51) Int. Cl.
 G01K 13/02 (2021.01)
 G01K 7/04 (2006.01)
(52) U.S. Cl.
 CPC ............... *G01K 13/02* (2013.01); *G01K 7/04* (2013.01)

(58) Field of Classification Search
CPC ............. G01K 7/02; G01K 13/02; G01K 7/04
See application file for complete search history.

(56) References Cited

U.S. PATENT DOCUMENTS

2011/0299562 A1* 12/2011 Hashemian .............. G01K 7/02
 374/182

FOREIGN PATENT DOCUMENTS

| EP | 3462152 A1 * | 4/2019 | ............... G01K 3/00 |
| GB | 2540770 A * | 2/2017 | ............... G01K 1/12 |

* cited by examiner

*Primary Examiner* — Mirellys Jagan
(74) *Attorney, Agent, or Firm* — JCIP GLOBAL INC.

(57) ABSTRACT

A temperature measurement method, a probe, and a device for measuring fluid temperature are disclosed. For the temperature measurement method, a main thermocouple is placed in a fluid to obtain a first temperature, two auxiliary thermocouples are placed on the two wires of the main thermocouple respectively to obtain a second temperature and a third temperature. Applying multiple stimuli to the main thermocouple makes it experience multiple thermal equilibrium states. The first temperature, the second temperature, and the third temperature in each thermal equilibrium state are obtained. In each thermal equilibrium state, energy conservation equations are established for the main thermocouple, and the energy conservation equations of all thermal equilibrium states are solved together to obtain the fluid temperature. The present invention also provides the probe and the device for implementation of the method. With the invention, the fluid temperature measurement accuracy in a steady flow field is improved.

3 Claims, 9 Drawing Sheets

TEMPERATURE MEASUREMENT METHOD, TEMPERATURE MEASUREMENT PROBE, AND TEMPERATURE MEASUREMENT DEVICE

CROSS-REFERENCE TO RELATED APPLICATION

This application claims the priority benefit of China application serial no. 202110344256.4, filed on Mar. 30, 2021. The entirety of the above-mentioned patent application is hereby incorporated by reference herein and made a part of this specification.

BACKGROUND

Technical Field

The invention relates to fluid temperature measurement, specifically to a temperature measurement method, a temperature measurement probe, and a temperature measurement device.

Description of Related Art

A thermocouple is in direct contact with a fluid (liquid or gas) to measure the fluid temperature. The measured temperature is actually the temperature of the sensing junction of the thermocouple. For butt welded thermocouples, the sensing junction is the welding face of the two thermocouple wires. When measuring the fluid with a temperature above ambient temperature, the measured temperature is usually lower than the fluid temperature. When measuring the fluid with a temperature below ambient temperature, the measured temperature is usually higher than the fluid temperature. The difference between the measured temperature and the fluid temperature is mainly related to the temperature, composition and velocity of the fluid, the ambient material and temperature, the size and material of the thermocouple, and the position and placement angle of the thermocouple. The difference between the measured temperature and the fluid temperature increases with the temperature difference between the fluid and the ambient environment. The difference between the measured temperature and the fluid temperature also increases with the thermocouple size.

SUMMARY

The invention is briefly described below. This description is not intended to limit the scope of protection of the claims.

This invention relates to a temperature measurement method for measuring the temperature of a fluid. The fluid maintains steady during the temperature measurement. The temperature measurement method comprises the steps of: placing a first sensing junction of a first thermocouple into the fluid and obtaining a first temperature through a first instrument electrically connected to the first thermocouple, the first thermocouple has a first wire and a second wire joined to form the first sensing junction; acquiring a second temperature at a first position on the first wire using a second thermocouple and a second instrument electrically connected to the second thermocouple; acquiring a third temperature at a second position on the second wire using a third thermocouple and a third instrument electrically connected to the third thermocouple; the first thermocouple is subjected to several different thermal equilibrium states during the temperature measurement; the first temperature, the second temperature, and the third temperature are obtained in each thermal equilibrium state; the number of thermal equilibrium states experienced during the temperature measurement is greater than or equal to the number of unknown variables in the variable set including a fluid temperature, an emissivity of the first wire, an emissivity of the second wire, an absorbed irradiation by the first wire, an absorbed irradiation by the second wire, a convection heat transfer coefficient between the first wire and the fluid, and a convection heat transfer coefficient between the second wire and the fluid; the first wire between the first sensing junction and the first position is discretized into at least two first elements along its extension direction; the second wire between the first sensing junction and the second position is discretized into at least two second elements along its extension direction; energy conservation equations are established for the sensing junction of the first thermocouple, each first element, and each second element in each thermal equilibrium state; all energy conservation equations in all thermal equilibrium states are solved together to obtain the fluid temperature.

The measured temperature of a thermocouple measuring a fluid is determined by energy conservation of two thermocouple wires near a sensing junction formed by joining the two wires. In a thermal equilibrium state, sum of heat transfer rates from the two wires to the sensing junction is 0. If energy conservation of the two wires are analyzed, the energy conservation of each thermocouple wire includes heat conduction inside the wire, heat conduction to the sensing junction, convection heat transfer between the wire and the fluid, radiation heat transfer between the wire and ambient environment, and radiation heat transfer between the wire and the fluid.

The first technical effect of the invention is that the second thermocouple is used to measure the second temperature at the first position on the first wire of the first thermocouple and the third thermocouple is used to measure the third temperature at the second position on the second wire of the first thermocouple. Therefore, the measured data includes the first temperature, the second temperature, and the third temperature. They provide a basis for establishing energy conservation equations and improve measurement accuracy compared with temperature measurement only by the first thermocouple.

The second technical effect of the invention is that the number of thermal equilibrium states experienced during temperature measurement can be determined according to the number of unknown variables in the variable set, so that the number of thermal equilibrium states cannot only meet the requirement for solving energy conservation equations but also can be reduced according to known variables for decreasing calculation time. In fact, among the seven variables in the variable set, the fluid temperature is an absolutely unknown variable, and the absorbed irradiation by the first wire, the absorbed irradiation by the second wire, the convection heat transfer coefficient between the first wire and the fluid, and the convection heat transfer coefficient between the second wire and the fluid are relatively unknown variables. The convection heat transfer coefficients between the first wire and the fluid and between the second wire and the fluid can be approximated to be equal when measurement accuracy and setting of the temperature measurement device meet certain requirements, so the number of unknown variables can be reduced to decrease calculation time. In addition, the emissivity of the first wire and the second wire can also be approximated to be equal when measurement accuracy requirements are met. Similarly, the absorbed irradiations by the first wire and the second wire can be approximated to be equal when measurement accuracy requirements are met. Therefore, the unknown variables generally can be reduced to four: the fluid temperature, the emissivity of the first wire (the second wire), the absorbed irradiation by the first wire (the second wire), and the convection heat transfer coefficient between the first wire (the second wire) and the fluid. Among them, the emissivity of the first wire (the second wire) is determined by its material and surface condition which may also be known. Therefore, the unknown variables can be further reduced to three: the fluid temperature, the absorbed irradiation by the first wire (the second wire), and the convection heat transfer coefficient between the first wire (the second wire) and the fluid. Among them, the absorbed irradiation by the first wire (the second wire) may also be known in some cases. Therefore, in general, the number of thermal equilibrium states experienced during temperature measurement is at least two.

The third technical effect of the invention is that the first wire between the first sensing junction and the first position is divided into multiple first elements along its extension direction, the second wire between the first sensing junction and the second position is divided into multiple second elements along its extension direction. Energy conservation equations are established for the sensing junction, each first element, and each second element, the fluid temperature can be obtained more accurately. With the increase of the number of the first elements and the number of the second elements, the calculated fluid temperature is more accurate with the cost of more equations and calculation time.

Based on the above three technical effects, the invention can realize higher fluid temperature measurement accuracy than simply obtaining the measured temperature with the first thermocouple. At the same time, this method has a wide range of applications and it can be applied with various types of thermocouples. Of course, the technical schemes of the invention also have limitations. Since the thermal equilibrium state needs to be changed at least once during measurement, the technical schemes of the invention are mainly used for temperature measurement in steady flow field. That is, the fluid temperature and flow characteristics at the measurement location remain unchanged during measurement.

BRIEF DESCRIPTION OF THE DRAWINGS

In order to describe technical schemes of embodiments more clearly, the following drawings are briefly introduced.

DESCRIPTION OF THE EMBODIMENTS

In the claims and specifications, unless stated otherwise, the term "steady" means that the temperature related parameters and flow related parameters of the fluid do not change with time during temperature measurement.

In the claims and specifications, unless stated otherwise, the term "obtain" includes obtaining directly from the output value of the instruments and calculating from the output value of the instruments with a predetermined way.

In the claims and specifications, unless stated otherwise, the term "unknown variables" refers to the variables to be solved. If there is a known relationship between two variables or they are artificially approximated to be equal or related based on consideration of calculation cost, even if the two variables are unknown, they shall be regarded as only one variable to be solved, that is, only one unknown variable.

In the claims and specifications, unless stated otherwise, the term "first position" does not refer to a specific position, but any position on the first wire close to the first sensing junction. Generally, the position of the second sensing junction of the second thermocouple is the first position. In the case with the protection jacket, the position where the first wire intersects the first end of the protection jacket can be used as the first position, but even in this case, unless explicitly stated in the technical scheme, the first position can be any position on the first wire close to the first sensing junction.

In the claims and specifications, unless stated otherwise, the term "second position" does not refer to a specific position, but any position on the second wire close to the first sensing junction. Generally, the position of the third sensing junction of the third thermocouple is the second position. In the case with the protection jacket, the position where the second wire intersects the first end of the protection jacket can be used as the second position, but even in this case, unless explicitly stated in the technical scheme, the second position can be any position on the second wire close to the first sensing junction.

In the claims and specifications, unless stated otherwise, the term "first end" refers to the end closer to the first sensing junction of the first thermocouple of the two ends of the protection jacket.

In the claims and specifications, unless stated otherwise, the term "inlet temperature" refers to the temperature of the coolant entering the coolant flow passage.

The technical schemes in the embodiments will be clearly described in detail with the attached drawings as follows.

Embodiment 1

Figure 1:
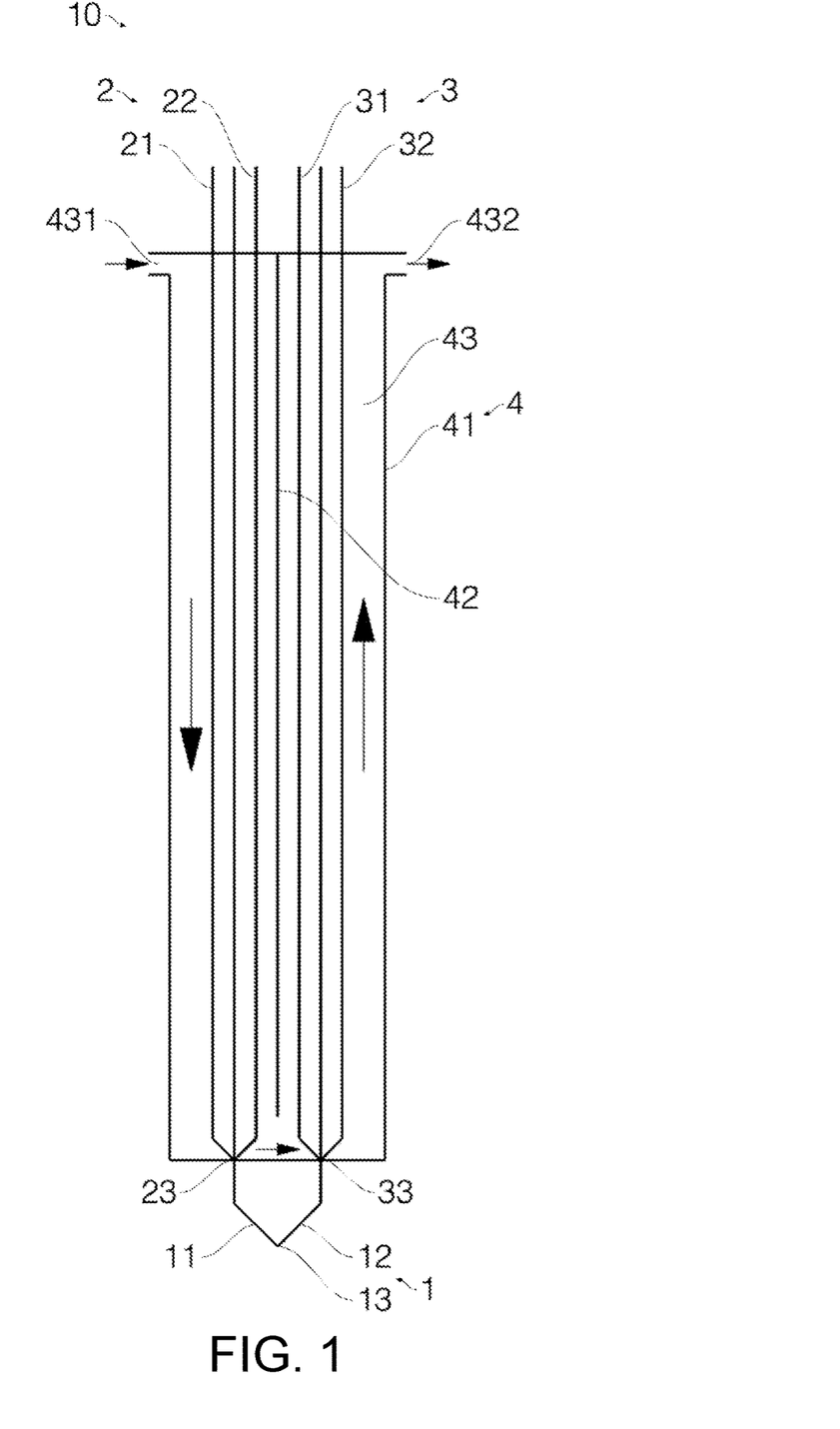
FIG. 1 is a schematic of a temperature measurement probe of embodiment 1.

FIG. 1 shows the temperature measurement probe 10 of embodiment 1. As seen in FIG. 1, the temperature measurement probe 10 of embodiment 1 comprises a first thermocouple 1, a second thermocouple 2, a third thermocouple 3, and a protection jacket 4.

The first thermocouple 1 comprises a first wire 11 and a second wire 12 fixedly joined to form a first sensing junction 13.

The second thermocouple 2 comprises a third wire 21 and a fourth wire 22 fixedly joined to form a second sensing junction 23.

The third thermocouple 3 comprises a fifth wire 31 and a sixth wire 32 fixedly joined to form a third sensing junction 33.

The protection jacket 4 comprises a housing 41 which comprises a shell and a baffle 42. The shell and the baffle 42 together form a coolant flow passage 43; and the two ends of the coolant flow passage 43 form a coolant inlet 431 and a coolant outlet 432 respectively. The coolant flow passage 43 is used for coolant flowing therein.

The protection jacket 4 is insulated from and fixedly connected to the first thermocouple 1 and it surrounds the first thermocouple 1, the second thermocouple 2, and the third thermocouple 3. The first sensing junction 13 of the first thermocouple 1 projects beyond the first end of the protection jacket 4. Here, the first end refers to the end closer to the first sensing junction 13 of the first thermocouple 1 of the two ends of the protection jacket 4. The first wire 11 intersects the first end of the protection jacket 4 at the first position, and the second wire 12 intersects the first end of the protection jacket 4 at the second position. The second sensing junction 23 of the second thermocouple 2 is located at the first position on the first wire 11. The third sensing junction 33 of the third thermocouple 3 is located at the second position on the second wire 12. Specifically, the butt joint (the second sensing junction 23) of the third wire 21 and the fourth wire 22 is embedded in the first wire 11 at the first position to fix the second thermocouple 2 relative to the first thermocouple 1. The butt joint (the third sensing junction 33) of the fifth wire 31 and the sixth wire 32 is embedded in the second wire 12 at the second position to fix the third thermocouple 3 relative to the first thermocouple 1. It can be seen in this embodiment that the second sensing junction 23 and the third sensing junction 33 are arranged on the first end face of the protection jacket 4.

In this embodiment, the coolant is insulated from the first thermocouple 1, the second thermocouple 2, and the third thermocouple 3. The coolant enters the coolant flow passage 43 from the coolant inlet 431, it first flows along the first wire 11 and the second thermocouple 2 to the first end of the protection jacket 4, turns around and bypasses the baffle 42, then flows along the second wire 12 and the third thermocouple 3 to the coolant outlet 432.

Figure 2:
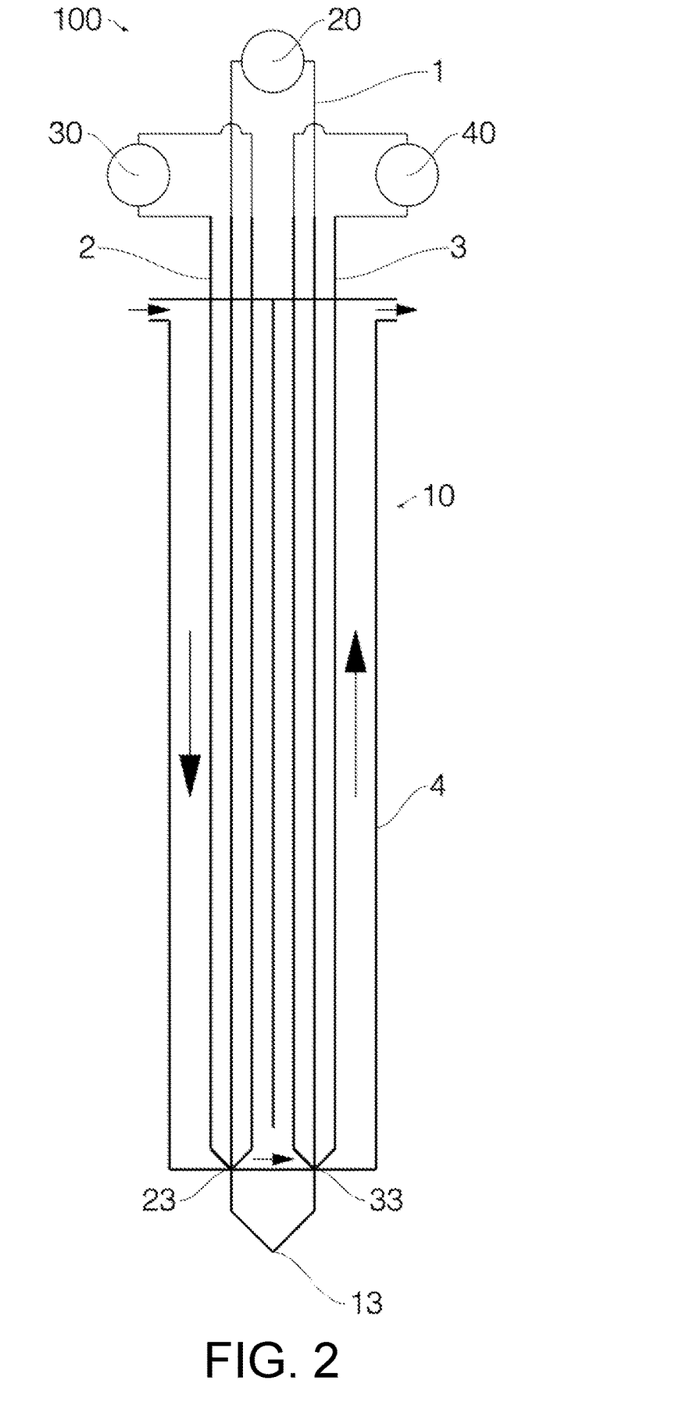
FIG. 2 is a schematic of a temperature measurement device of embodiment 1.

FIG. 2 shows the temperature measurement device 100 of embodiment 1. In addition to the above temperature measurement probe 10, the temperature measurement device 100 also comprises a first instrument 20, a second instrument 30, and a third instrument 40. The first instrument 20 is electrically connected to the cold end of the first thermocouple 1 to convert the electromotive force of the first thermocouple 1 into a first measured temperature. The second instrument 30 is electrically connected to the cold end of the second thermocouple 2 to convert the electromotive force of the second thermocouple 2 into a second measured temperature, and the third instrument 40 is electrically connected to the cold end of the third thermocouple 3 to convert the electromotive force of the third thermocouple 3 into a third measured temperature.

The temperature measurement device 100 in the embodiment is used to measure the temperature of a fluid remaining steady state during temperature measurement. The steady state here means that temperature related parameters and flow related parameters in the fluid do not change with time during temperature measurement.

The method of measuring the fluid temperature with the temperature measurement device 100 in the embodiment includes the steps as follows.

Placing the first sensing junction 13 of the first thermocouple 1 into the fluid.

Determining the number of unknown variables in the variable set. Here, the unknown variables refer to the variables to be solved. If there is a known correlation between two variables or two variables are artificially approximated to be equal or related based on consideration of calculation cost, even if the two variables are unknown, they shall be regarded as only one variable to be solved, that is, only one unknown variable.

The variables in the variable set include the fluid temperature Tf, the emissivity $\varepsilon_A$ of the first wire 11, the emissivity $\varepsilon_B$ of the second wire 12, the absorbed irradiation $\alpha_A G$ by the first wire 11, the absorbed irradiation $\alpha_B G$ by the second wire 12, the convection heat transfer coefficient $h_A$ between the first wire 11 and the fluid, and the convection heat transfer coefficient $h_B$ between the second wire 12 and the fluid.

The first thermocouple 1 is subjected to several different thermal equilibrium states during the temperature measurement. The number of thermal equilibrium states is determined according to the number of unknown variables in the variable set. The number of thermal equilibrium states should be greater than or equal to the number of unknown variables. Generally, in order to reduce the calculation cost, the number of thermal equilibrium states is set to be equal to the number of unknown variables. In this embodiment, the method of stimulating the first thermocouple 1 to change thermal equilibrium states can be cooling the first thermocouple 1 with coolant flow, changing the inlet temperature of the coolant, or changing the flow rate of the coolant. The inlet temperature here refers to the temperature of the coolant entering the coolant flow passage 43. When changing the inlet temperature of the coolant, the coolant flow passage 43 can be connected to the coolant with different inlet temperature, or a temperature regulating device can be set in front of the coolant inlet 431 to adjust the coolant inlet temperature. When changing the coolant flow rate, a manual flow valve can be set in front of the coolant inlet 431 or behind the coolant outlet 432 to adjust the coolant flow rate through manual operation.

In each thermal equilibrium state, the first measured temperature, the second measured temperature, and the third measured temperature are collected respectively. The first temperature of the first sensing junction 13, the second temperature at the first position on the first wire 11, and the third temperature at the second position on the second wire 12 are obtained according to the first measured temperature, the second measured temperature, and the third measured temperature. In this embodiment, the first temperature is the first measured temperature, the second temperature is the second measured temperature, and the third temperature is the third measured temperature.

Figure 9:
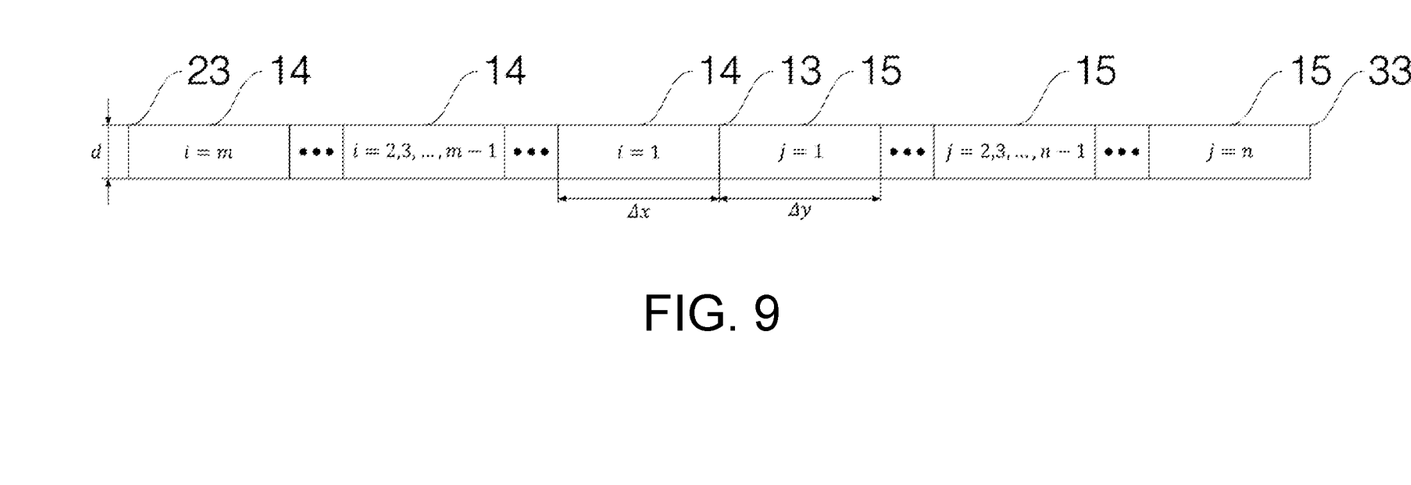
FIG. 9 is a schematic of first elements and second elements of an unfolded first thermocouple of embodiment 1.

As shown in FIG. 9, the first wire 11 between the first sensing junction 13 and the first position is divided into at least two first elements 14 along its extension direction, the second wire 12 between the first sensing junction 13 and the second position is divided into at least two second elements 15 along its extension direction. Energy conservation equations are established in each thermal equilibrium state for each first element 14, each second element 15, and the sensing junction 13. All energy conservation equations in all thermal equilibrium states are solved together to obtain the fluid temperature.

In this embodiment, the diameter of the first wire 11 is equal to the diameter of the second wire 12, and the length of the first elements 14 are the same and the length of the second elements 15 are the same. Under these conditions, the energy conservation equation of the sensing junction 13 is $$KA_p(i)\frac{\pi d^2}{4}\frac{TA_p(i)-Tw_p}{\frac{\Delta x}{2}}+KB_p(j)\frac{\pi d^2}{4}\frac{TB_p(j)-Tw_p}{\frac{\Delta y}{2}}=0$$

where $i=1$ and $j=1$.

The energy conservation equations of the first elements 14 include the energy conservation equations of the first element 14 adjacent to the first sensing junction 13, the first element 14 adjacent to the first position, and other first elements 14.

The energy conservation equation of the first element 14 adjacent to the first sensing junction 13 is $$KA_p(i)\frac{\pi d^2}{4}\frac{Tw_p-TA_p(i)}{\frac{\Delta x}{2}}+\frac{KA_p(i)+KA_p(i+1)}{2}\frac{\pi d^2}{4}\frac{TA_p(i+1)-TA_p(i)}{\Delta x}+$$

$$h_A\pi d\Delta x(Tf-TA_p(i))+\pi d\Delta x\left(\alpha_A G-\varepsilon_A\sigma TA_p(i)^4\right)+I_p^2 RA_p(i)=0$$

where $i=1$.

The energy conservation equation of the first element 14 adjacent to the first position is $$\frac{KA_p(i)+KA_p(i-1)}{2}\frac{\pi d^2}{4}\frac{TA_p(i-1)-TA_p(i)}{\Delta x}+KA_p(i)\frac{\pi d^2}{4}\frac{TA_p-TA_p(i)}{\frac{\Delta x}{2}}+$$

$$h_A\pi d\Delta x(Tf-TA_p(i))+\pi d\Delta x\left(\alpha_A G-\varepsilon_A\sigma TA_p(i)^4\right)+I_p^2 RA_p(i)=0$$

where $i=m$.

The energy conservation equations of other first elements 14 are $$\frac{KA_p(i)+KA_p(i-1)}{2}\frac{\pi d^2}{4}\frac{TA_p(i-1)-TA_p(i)}{\Delta x}+$$

$$\frac{KA_p(i)+KA_p(i+1)}{2}\frac{\pi d^2}{4}\frac{TA_p(i+1)-TA_p(i)}{\Delta x}+$$

$$h_A\pi d\Delta x(Tf-TA_p(i))+\pi d\Delta x\left(\alpha_A G-\varepsilon_A\sigma TA_p(i)^4\right)+I_p^2 RA_p(i)=0$$

where $i=2,3,\ldots,m-1$.

The energy conservation equations of the second elements 15 include the energy conservation equations of the second element 15 adjacent to the first sensing junction 13, the second element 15 adjacent to the second position, and other second elements 15.

The energy conservation equation of the second element 15 adjacent to the first sensing junction 13 is $$KB_p(j)\frac{\pi d^2}{4}\frac{Tw_p-TB_p(j)}{\frac{\Delta y}{2}}+$$

$$\frac{KB_p(j)+KB_p(j+1)}{2}\frac{\pi d^2}{4}\frac{TB_p(j+1)-TB_p(j)}{\Delta y}+$$

$$h_B\pi d\Delta y(Tf-TB_p(j))+\pi d\Delta y\left(\alpha_B G-\varepsilon_B\sigma TB_p(j)^4\right)+I_p^2 RB_p(j)=0$$

where $j=1$;

The energy conservation equation of the second element 15 adjacent to the second position is $$\frac{KB_p(j)+KB_p(j-1)}{2}\frac{\pi d^2}{4}\frac{TB_p(j-1)-TB_p(j)}{\Delta y}+$$

$$KB_p(j)\frac{\pi d^2}{4}\frac{TB_p-TB_p(j)}{\frac{\Delta y}{2}}+h_B\pi d\Delta y(Tf-TB_p(j))+$$

$$\pi d\Delta y\left(\alpha_B G-\varepsilon_B\sigma TB_p(j)^4\right)+I_p^2 RB_p(j)=0$$

where $j=n$.

The energy conservation equations of other second elements 15 are $$\frac{KB_p(j)+KB_p(j-1)}{2}\frac{\pi d^2}{4}\frac{TB_p(j-1)-TB_p(j)}{\Delta y}+$$

$$\frac{KB_p(j)+KB_p(j+1)}{2}\frac{\pi d^2}{4}\frac{TB_p(j+1)-TB_p(j)}{\Delta y}+$$

$$h_B\pi d\Delta y(Tf-TB_p(j))+\pi d\Delta y\left(\alpha_B G-\varepsilon_B\sigma TB_p(j)^4\right)+I_p^2 RB_p(j)=0$$

where $j=2,3,\ldots,n-1$.

In the above energy conservation equations, i is the serial number of the first elements which is a natural number from 1 to m, the closer it is to the first sensing junction, the smaller the i value is, m is the number of the first elements;

j is the serial number of the second element which is a natural number from 1 to n, the closer it is to the first sensing junction, the smaller the j value is, n is the number of the second elements;

p is the serial number of the equilibrium states which is a natural number from 1 to q, q is the number of the thermal equilibrium states;

d is the diameter of the first wire;

$\Delta x$ is the length of each first element which is calculated by dividing the length $L_A$ between the first sensing junction and the first position by m;

$\Delta y$ is the length of each second element which is calculated by dividing the length $L_B$ between the first sensing junction and the second position by n;

$\sigma$ is the Stefan-Boltzmann constant;

Tf is the fluid temperature;

$\varepsilon_A$ is the emissivity of the first wire;

$\varepsilon_B$ is the emissivity of the second wire;

$\alpha_A G$ is the absorbed irradiation by the first wire;

$\alpha_B G$ is the absorbed irradiation by the second wire;

$h_A$ is the convection heat transfer coefficient between the first wire and the fluid;

$h_B$ is the convection heat transfer coefficient between the second wire and the fluid;

$Tw_p$ is the first temperature in the $p^{th}$ thermal equilibrium state;

TA$_p$ is the second temperature in the p$^{th}$ thermal equilibrium state;

TB$_p$ is the third temperature in the p$^{th}$ thermal equilibrium state;

TA$_p$(i) is the temperature of the i$^{th}$ first element in the p$^{th}$ thermal equilibrium state;

TA$_p$(i−1) is the temperature of the first element adjacent to the i$^{th}$ first element and further away from the first position in the p$^{th}$ thermal equilibrium state;

TA$_p$(i+1) is the temperature of the first element adjacent to the i$^{th}$ first element and further away from the first sensing junction in the p$^{th}$ thermal equilibrium state;

TB$_p$(i) is the temperature of the j$^{th}$ second element in the p$^{th}$ thermal equilibrium state;

TB$_p$(i−1) is the temperature of the second element adjacent to the j$^{th}$ second element and further away from the second position in the p$^{th}$ thermal equilibrium state;

TB$_p$(j+1) is the temperature of the second element adjacent to the j$^{th}$ second element and further away from the first sensing junction in the p$^{th}$ thermal equilibrium state;

KA$_p$(i) is the thermal conductivity of the i$^{th}$ first element in the p$^{th}$ thermal equilibrium state which is determined by the material of the first wire and is a known function of TA$_p$(i);

KA$_p$(i−1) is the thermal conductivity of the first element adjacent to the i$^{th}$ first element and further away from the first position in the p$^{th}$ thermal equilibrium state which is determined by the material of the first wire and is a known function of TA$_p$(i−1);

KA$_p$(i+1) is the thermal conductivity of the first element adjacent to the i$^{th}$ first element and further away from the first sensing junction in the p$^{th}$ thermal equilibrium state which is determined by the material of the first wire and is a known function of TA$_p$(i+1);

KB$_p$(j) is the thermal conductivity of the j$^{th}$ second element in the p$^{th}$ thermal equilibrium state which is determined by the material of the second wire and is a known function of TB$_p$(j);

KB$_p$(j−1) is the thermal conductivity of the second element adjacent to the j$^{th}$ second element and further away from the second position in the p$^{th}$ thermal equilibrium state which is determined by the material of the second wire and is a known function of TB$_p$(j−1);

KB$_p$(j+1) is the thermal conductivity of the second element adjacent to the j$^{th}$ second element and further away from the first sensing junction in the p$^{th}$ thermal equilibrium state which is determined by the material of the second wire and is a known function of TB$_p$(j+1);

I$_p$ is the electric current through the first thermocouple in the p$^{th}$ thermal equilibrium state;

RA$_p$(i) is the electric resistance of the i$^{th}$ first element in the p$^{th}$ thermal equilibrium state which is determined by the material of the first wire and is a known function of TA$_p$(i);

RB$_p$(j) is the electric resistance of the j$^{th}$ second element in the p$^{th}$ thermal equilibrium state which is determined by the material of the second wire and is a known function of TB$_p$(j).

It should be noted that the discretized energy conservation expressions in this embodiment are not the only way of the energy conservation discretization. The energy conservation equations in this embodiment use the first order discretization. Those skilled in the art may also use the second order or higher order discretization scheme to achieve the purpose of this invention. Even for the first order discretization, in order to achieve better accuracy, the energy conservation equations in this embodiment can be improved. For example, the energy conservation equation of the i$^{th}$ (i=2, 3, ..., m−1) first element can have the expression of this embodiment, $$\frac{KA_p(i) + KA_p(i-1)}{2} \frac{\pi d^2}{4} \frac{TA_p(i-1) - TA_p(i)}{\Delta x} +$$
$$\frac{KA_p(i) + KA_p(i+1)}{2} \frac{\pi d^2}{4} \frac{TA_p(i+1) - TA_p(i)}{\Delta x} +$$
$$h_A \pi d \Delta x (Tf - TA_p(i)) + \pi d \Delta x (\alpha_A G - \varepsilon_A \sigma TA_p(i)^4) + I_p^2 RA_p(i) = 0$$

it can also be $$KA_p(i-1/2) \frac{\pi d^2}{4} \frac{TA_p(i-1) - TA_p(i)}{\Delta x} +$$
$$KA_p(i+1/2) \frac{\pi d^2}{4} \frac{TA_p(i+1) - TA_p(i)}{\Delta x} + h_A \pi d \Delta x (Tf - TA_p(i)) +$$
$$\pi d \Delta x (\alpha_A G - \varepsilon_A \sigma TA_p(i)^4) + I_p^2 RA_p(i) = 0$$

where KA$_p$(i−1/2) is a known function of TA$_p$(i−1/2). TA$_p$(i−1/2) is the temperature of the interface between the i$^{th}$ first element and the (i−1)$^{th}$ first element which can be approximated to TA$_p$(i−1)/2+TA$_p$(i)/2. KA$_p$(i+1/2) is a known function of TA$_p$(i+1/2). TA$_p$(i+1/2) is the temperature of the interface between the i$^{th}$ first element and the (i+1)$^{th}$ first element which can be approximated to TA$_p$(i+1)/2+TA$_p$(i)/2.

A three-dimensional fluid-solid conjugate heat transfer of the temperature measurement device 100 in a flow field is simulated with Computational Fluid Dynamics (CFD). The CFD simulation is considered as a numerical experiment whose result is used to verify the temperature measurement accuracy of this invention. The conditions for the CFD simulation are as follows. The fluid is nitrogen with temperature 2400K and flow velocity 6 m/s. The inlet temperature of the coolant is 300K. The first thermocouple 1, the second thermocouple 2, and the third thermocouple 3 are K type thermocouples. Both the diameters of the first wire 11 and the second wire 12 are 0.4 mm. Along their extension direction, both the length L$_A$ of the first wire 11 projecting beyond the protection jacket and the length L$_B$ of the second wire 12 projecting beyond the protection jacket are 4.6 mm. Both the emissivity $\varepsilon_A$ of the first wire 11 and the emissivity $\varepsilon_B$ of the second wire 12 are 0.5. The irradiation G is known which is a black body radiation from the ambient environment with temperature 300K. The absorptivity $\alpha_A$ of the first wire 11 and the absorptivity $\alpha_B$ of the second wire 12 are equal to the emissivity $\varepsilon_A$ of the first wire 11.

In order to obtain the fluid temperature with the method of the invention, the one-dimensional energy conservation equations in all equilibrium states need to be solved together. The setting of the discretized energy conservation equations are as follows. Both the number m of the first elements 14 and the number n of the second elements 15 are set to 100. The convection heat transfer coefficient h$_A$ between the first wire 11 and the fluid and the convection heat transfer coefficient h$_B$ between the second wire 12 and the fluid are set to be equal. The emissivity $\varepsilon_A$ of the first wire 11 and the emissivity $\varepsilon_B$ of the second wire 12 are set to be equal. Therefore, the unknown variables are three which are the fluid temperature Tf, the emissivity of the first wire 11 $\varepsilon_A$, and the convection heat transfer coefficient h$_A$ between the first wire 11 and the fluid.

Since the unknown variables are three, at least three different thermal equilibrium states are needed in the CFD simulation. In this embodiment, the coolant flow rate is changed to vary the equilibrium state. TAB. 1 shows the first measured temperature (CFD solved first sensing junction temperature of the first thermocouple), the second measured temperature (CFD solved second sensing junction temperature of the second thermocouple), and the third measured temperature (CFD solved third sensing junction temperature of the third thermocouple) in three equilibrium states with different coolant inlet velocity of the CFD simulation result.

TABLE 1

CFD simulated first measured temperature, second measured temperature, and third measured temperature in three different equilibrium states

| No | Coolant velocity (m/s) | First measured temperature (K) | Second measured temperature (K) | Third measured temperature (K) |
|---|---|---|---|---|
| 1 | 0.2 | 1484.344 | 539.855 | 539.351 |
| 2 | 0.3 | 1477.129 | 501.042 | 500.337 |
| 3 | 0.5 | 1470.571 | 464.931 | 463.917 |

The first measured temperature, the second measured temperature, and the third measured temperature in TAB. 1 of the CFD simulation result are set to the first temperature $Tw_p$, the second temperature $TA_p$, and the third temperature $TB_p$ respectively. With other known parameters, the one-dimensional energy conservation equations are solved together. The solved fluid temperature Tf is 2433.4K which is higher than the real fluid temperature 2400K in the numerical experiment (CFD simulation), the relative error is 1.4%. The solved emissivity $\varepsilon_A$ of the first wire is 0.48 which is lower than the real value 0.5 in the numerical experiment (CFD simulation), the relative error is 4%.

As a comparative case, a numerical experiment (CFD simulation) is carried out for a regular K type thermocouple same as the first thermocouple measuring the same fluid without cooling. The measured temperature (CFD solved sensing junction temperature of the thermocouple) is 1787.13K, and the relative error is 26.5%.

Compared with the direct measurement with a single thermocouple, the invention method using the first temperature, the second temperature, and the third temperature improves the measurement accuracy.

Since the number of thermal equilibrium states is determined according to the number of unknown variables in the variable set, it does not only meet the requirement for solving energy conservation equations but also reduces the number of energy conservation equations to decrease calculation time according to known variables. In this example, even if many approximations are introduced to reduce the unknown variables to three, the high measurement accuracy is still obtained. In this embodiment, the number of the first elements 14 and the number of the second elements 15 are set to 100, which can effectively reduce the error to improve the fluid temperature measurement accuracy. As the number of the first elements 14 and the second elements 15 increase, the calculated fluid temperature will be more accurate. Of course, the number of equations and the calculation time are also increased. In summary, as can be seen from this example, the temperature measurement method in this embodiment has higher accuracy than directly measuring the fluid temperature using a single thermocouple. At the same time, this method has a wide range of applications and can be applied with various types of thermocouples.

Using the unique measurement method with the probe 10 and the device 100 in embodiment 1, the first thermocouple 1 is cooled by the flowing coolant to reduce the temperature of the first sensing junction 13 of the first thermocouple 1 by at least 302.79K (1787.13K−1484.34K=302.79K). By increasing coolant flow rate, the temperature of the first sensing junction 13 can be further reduced. Specifically, in this example, the maximum temperature 1484.34K measured by the first thermocouple is lower than the melting temperature of K type thermocouple material. Therefore, the temperature measurement method, the probe, and the device 100 in embodiment 1 can be applied to the real measurement environment specified in this example. In the comparative case, 1787.13K has exceeded the melting temperature of K type thermocouple material, the K type thermocouple will be melted in the real measurement environment, noble metal thermocouples should be used. So, when measuring a very high fluid temperature, the technical scheme of embodiment 1 can reduce the temperature of the first thermocouple 1, it is not necessary to use noble metal thermocouples and cheaper thermocouples can be used, which reduces the cost of the temperature measurement device 100.

Embodiment 2

Figure 3:
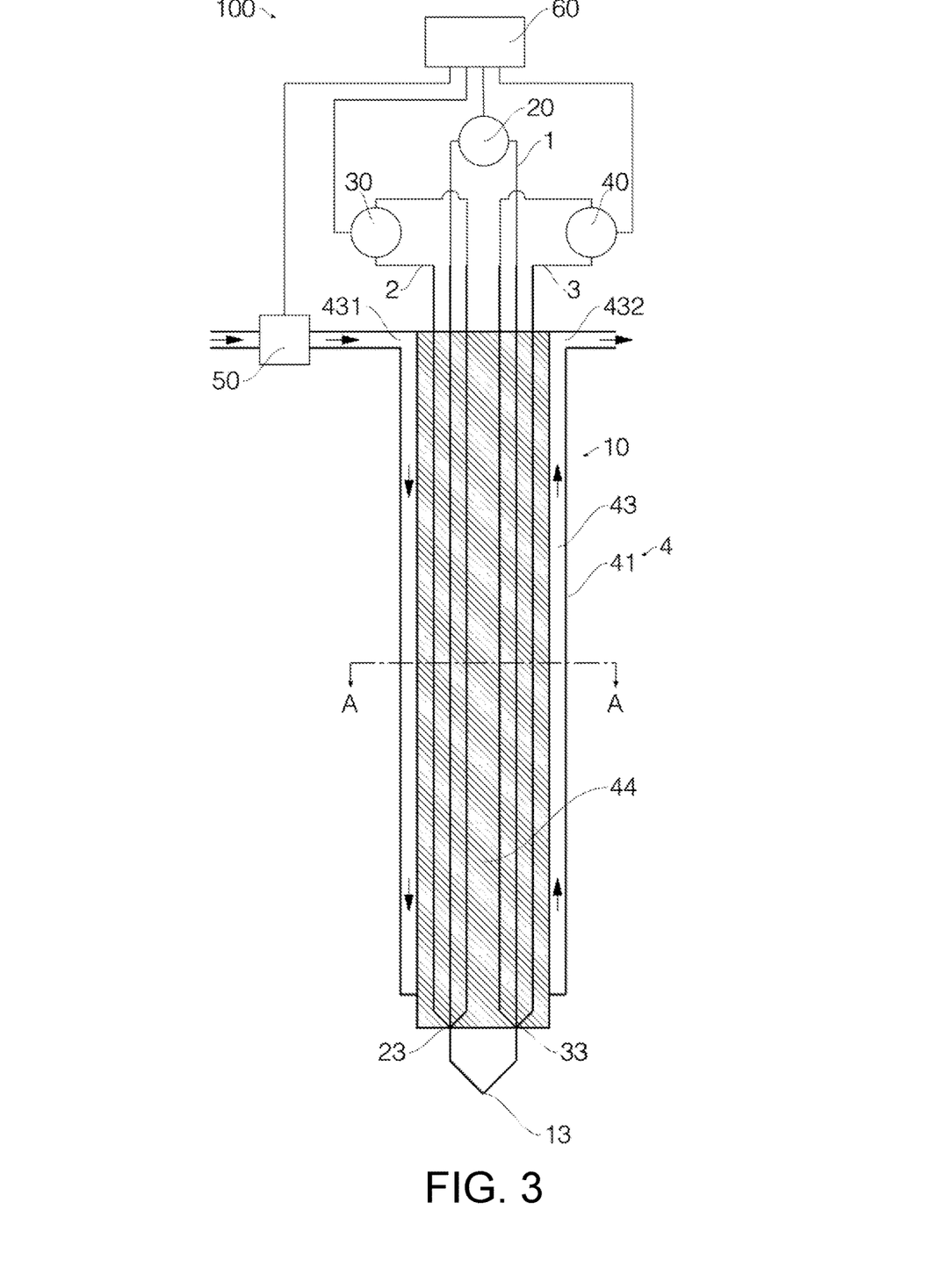
FIG. 3 is a schematic of a temperature measurement device of embodiment 2.
Figure 4:
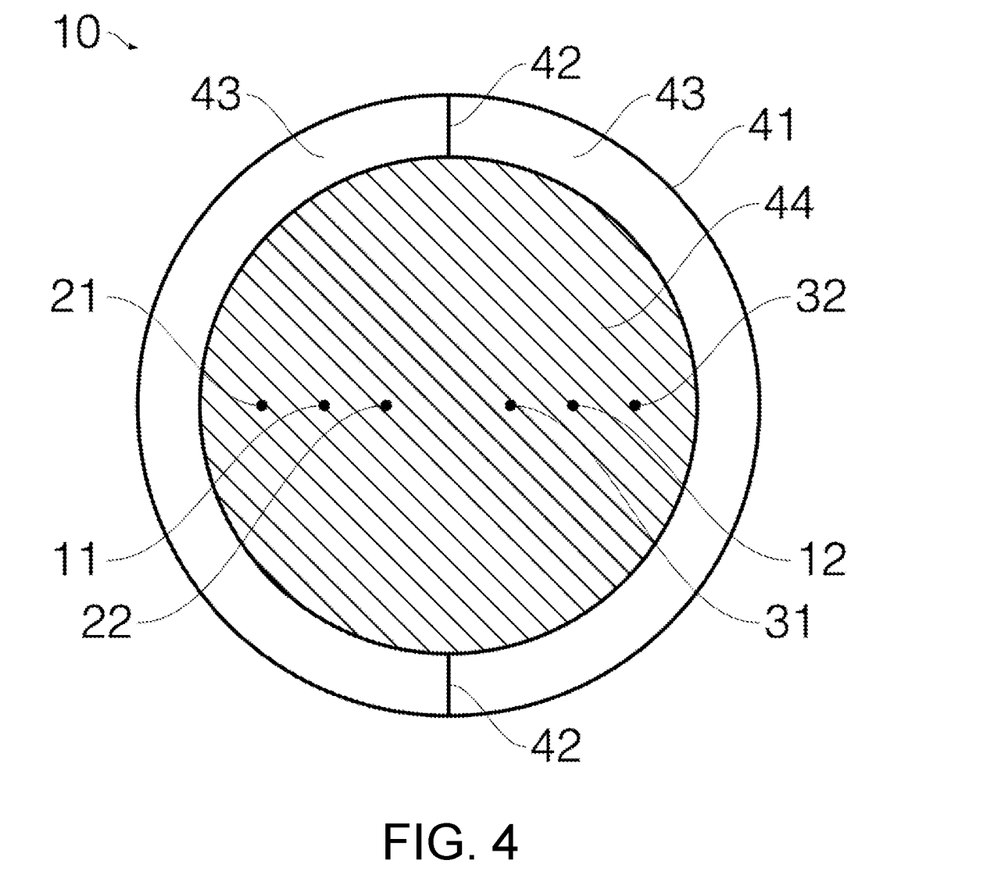
FIG. 4 is an A-A cross section of FIG. 3.

The temperature measurement device 100 in embodiment 2 is shown in FIG. 3 and FIG. 4. The same part of the device 100 in embodiment 2 and the device 100 in embodiment 1 is not repeated here, and the different part of them is mainly introduced.

In this embodiment, the protection jacket 4 in the temperature measurement probe 10 includes a housing 41 and a filling 44 as shown in FIGS. 3 and 4. The housing 41 includes an outer shell and an inner shell. The length of the inner shell is more than the length of the outer shell, so that the first end of the protection jacket 4 is formed on the end face of the inner shell. A baffle 42 is set between the inner shell and the outer shell to form a coolant flow passage 43. The filling 44 fills the inner shell. The first thermocouple 1, the second thermocouple 2, and the third thermocouple 3 are insulated from and embedded in the filling 44 to protect the three thermocouples and improve the service life of the temperature measurement probe 10 and the temperature measurement device 100. In this embodiment, the filling 44 uses the material of magnesium oxide. Generally, in order to make the filling 44 have good thermal conduction capability, the thermal conductivity of the filling material is not less than 20 W/(m·K). When the filling 44 has large thermal conductivity, $TA_p$ is close to $TB_p$, so that $h_A$ and $h_B$ can be approximated to be equal. Of course, if $h_A$ and $h_B$ do not need to be approximately equal, the filling 44 does not need large thermal conductivity.

Another difference between the temperature measurement probe 10 in embodiment 2 and the temperature measurement probe 10 in embodiment 1 is that the second sensing junction 23 is embedded in the filling 44 and close to the first position where the first wire 11 intersects the first end of the protection jacket 4, and the distance between the second sensing junction 23 and the first position does not exceed 1 mm. Similarly, the third sensing junction 33 is also embedded in the filling 44 and close to the second position where the second wire 12 intersects the first end of the protection jacket 4, and the distance between the third sensing junction 33 and the second position does not exceed 1 mm. The advantage of this arrangement is that the second sensing junction 23 and the third sensing junction 33 can avoid convection heat transfer with the fluid, the temperature distribution is more uniform where the second sensing junction 23 and the third sensing junction 33 are located and the temperature measurement of the second thermocouple and the third thermocouple is more accurate. Of course, since there is a distance between the second sensing junction 23 and the first position, the second measured temperature is not the second temperature at the first position. When the accuracy meets the requirement, the second temperature can be approximated to be the second measured temperature. The second temperature can also be calculated through linear interpolation considering the first measured temperature, the second measured temperature, the distance between the second sensing junction 23 and the first position, and the distance between the first position and the first sensing junction 13. Similarly, the third measured temperature is not the third temperature at the second position. When the accuracy meets the requirement, the third temperature can be approximated to be the third measured temperature. The third temperature can also be calculated through linear interpolation considering the first measured temperature, the third measured temperature, the distance between the third sensing junction 33 and the second position, and the distance between the second position and the first sensing junction 13.

Compared with the temperature measurement device 100 in embodiment 1, the temperature measurement device 100 in embodiment 2 also includes a flow rate regulator 50 and a control and algorithm unit 60.

The flow rate regulator 50 is connected to the coolant flow passage 43 to adjust the coolant flow rate in the coolant flow passage 43. In this embodiment, the flow rate regulator 50 is installed in front of the coolant inlet 431. In other embodiments, the flow rate regulator 50 can also be installed behind the coolant outlet 432. In this embodiment, the flow rate regulator 50 uses an electronic flow control valve. In other embodiments, the flow rate regulator 50 may be any device suitable for adjusting flow rate known to those skilled in the art.

The control and algorithm unit 60 is electrically or signally connected to the first instrument 20, the second instrument 30, the third instrument 40, and the flow rate regulator 50. The control and algorithm unit 60 controls the flow rate regulator 50 to adjust the coolant flow rate to stimulate the first thermocouple 1 to change thermal equilibrium states. The control and algorithm unit 60 also controls the first instrument 20, the second instrument 30, and the third instrument 40 to collect the first measured temperature, the second measured temperature, and the third measured temperature respectively in the thermal equilibrium states. The control and algorithm unit 60 also obtains the first temperature, the second temperature, and the third temperature according to the first measured temperature, the second measured temperature, and the third measured temperature. It solves all energy conservation equations to obtain the fluid temperature.

The flow rate regulator 50 can electronically adjust the coolant flow rate to stimulate the first thermocouple 1 to change thermal equilibrium states.

With the control and algorithm unit 60, the first thermocouple 1 can be stimulated by automatic control; after a stimulation, the control and algorithm unit 60 determines if a thermal equilibrium state is reached by continuously monitoring the first measured temperature, the second measured temperature, and the third measured temperature or by judging if a certain amount of time has elapsed. If the thermal equilibrium state is reached, the control and algorithm unit 60 collects the first measured temperature, the second measured temperature, and the third measured temperature in the equilibrium state, then the control and algorithm unit 60 obtains the first temperature, the second temperature, and the third temperature accordingly. The method of obtaining the first temperature, the second temperature, and the third temperature from the first measured temperature, the second measured temperature, and the third measured temperature has been described earlier and will not be repeated here. The control and algorithm unit 60 can automatically solve the energy conservation equations, which is conducive to quickly obtain the fluid temperature.

The difference between the temperature measurement methods in embodiment 1 and embodiment 2 are: embodiment 2 adopts the control and algorithm unit 60 to control the flow rate regulator 50 for stimulating the first thermocouple 1; the control and algorithm unit 60 determines if a thermal equilibrium state is reached based on the variation of the first measured temperature, the second measured temperature, and the third measured temperature with time or the time elapsed; after the thermal equilibrium state is reached, the control and algorithm unit 60 collects the first measured temperature, the second measured temperature, and the third measured temperature in the equilibrium state, then the control and algorithm unit 60 obtains the first temperature, the second temperature, and the third temperature accordingly.

Embodiment 3

Figure 5:
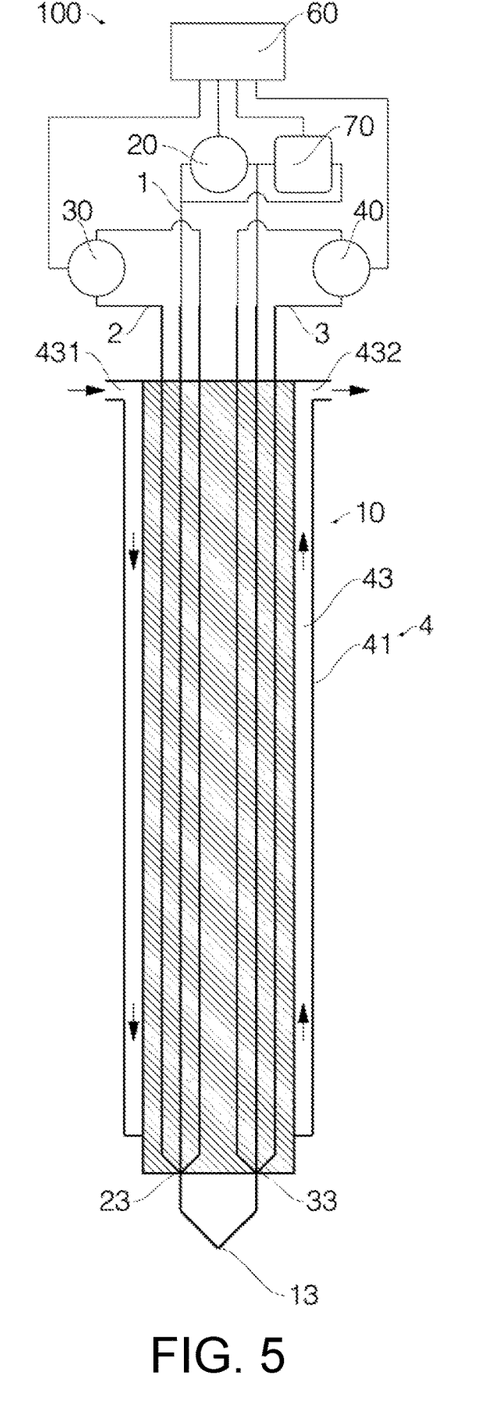
FIG. 5 is a schematic of a temperature measurement device of embodiment 3.

The temperature measurement device 100 in embodiment 3 is shown in FIG. 5. The same part of the device 100 in embodiment 3 and the device 100 in embodiment 2 is not repeated here, and the different part of them is mainly introduced.

There is no difference between the temperature measurement probe 10 in embodiment 3 and the temperature measurement probe 10 in embodiment 2.

Compared with the temperature measurement device 100 in embodiment 2, the temperature measurement device 100 in embodiment 3 no longer has a flow rate regulator 50, but it comprises a current regulator 70 which is electrically connected to the cold end of the first thermocouple 1 for opening or closing the power supply to the first thermocouple 1 or adjusting the current through the first thermocouple 1. Specifically, the two electrodes of the current regulator 70 are electrically connected to the cold end of the first wire 11 and the cold end of the second wire 12 respectively, that is, the current regulator 70 is connected in parallel with the first instrument 20. In this embodiment, the current regulator 70 adopts a power supply with adjustable voltage, but in other embodiments, the current regulator 70 may be any device known in the art with the function of adjusting voltage or current.

Different from embodiment 2, the control and algorithm unit 60 in embodiment 3 is no longer electrically or signally connected to the flow rate regulator 50, but electrically or signally connected to the current regulator 70 for controlling the current regulator 70 to open or close power supply to the first thermocouple 1 or change the current through the first thermocouple 1 to stimulate the first thermocouple 1 to change thermal equilibrium states.

Using the current regulator 70 to stimulate the first thermocouple 1 to change thermal equilibrium states has the advantages of simplicity, fast stimulation response, and short time to achieve thermal equilibrium.

The difference between the temperature measurement methods in embodiment 2 and embodiment 3 are as follows.

In embodiment 3, the control and algorithm unit 60 controls the current regulator 70 to open or close the power supply to the first thermocouple 1 or adjust the current through the first thermocouple 1. After the control and algorithm unit 60 determines that a thermal equilibrium state of the first thermocouple 1 is reached based on the variation of the second measured temperature and the third measured temperature with time or the time elapsed, it controls the current regulator 70 to cut off the power supply to the first thermocouple and controls the first instrument 20, the second instrument 30, and the third instrument 40 to immediately collect the first measured temperature, the second measured temperature, and the third measured temperature respectively. Of course, in other embodiments, when the first instrument 20 is selected to have both large voltage measurement range and high sensitivity, the control and algorithm unit 60 can control the first instrument 20, the second instrument 30, and the third instrument 40 to collect the first measured temperature, the second measured temperature, and the third measured temperature respectively without cutting off the power supply to the first thermocouple 1.

Embodiment 4

Figure 6:
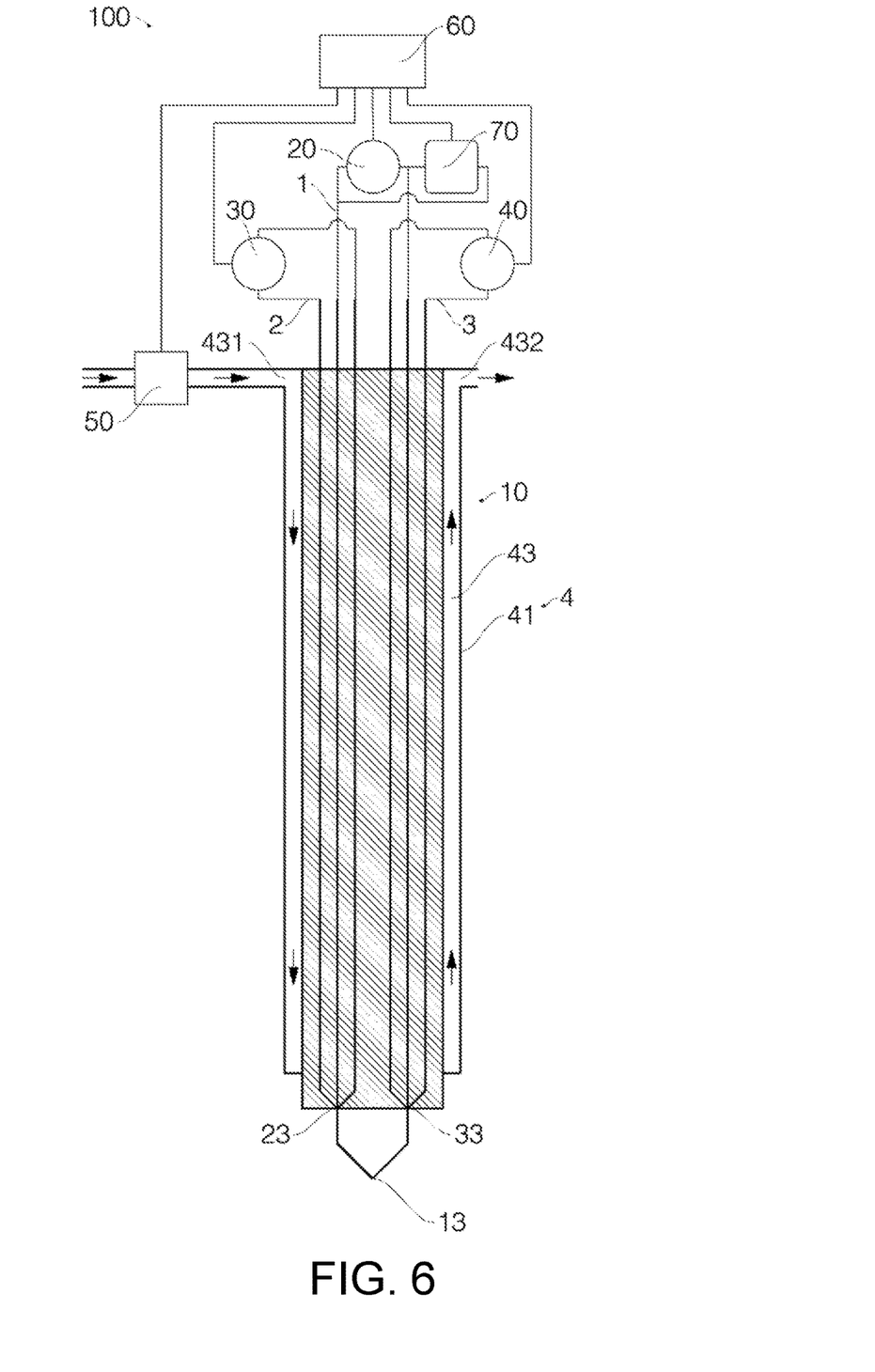
FIG. 6 is a schematic of a temperature measurement device of embodiment 4.

As seen in FIG. 6, the only difference between the temperature measurement device 100 in embodiment 4 and embodiment 3 is that a flow rate regulator 50 is added in embodiment 4. The control and algorithm unit 60 is also electrically or signally connected to the flow rate regulator 50 to control the flow rate regulator 50 to adjust the coolant flow rate to stimulate the first thermocouple 1 to change thermal equilibrium states. Embodiment 4 can stimulate the first thermocouple 1 to change thermal equilibrium states by controlling the flow rate regulator 50 to adjust the coolant flow rate and controlling the current regulator 70 to open or close the power supply or adjust the current through the first thermocouple 1.

Embodiment 5

Figure 7:
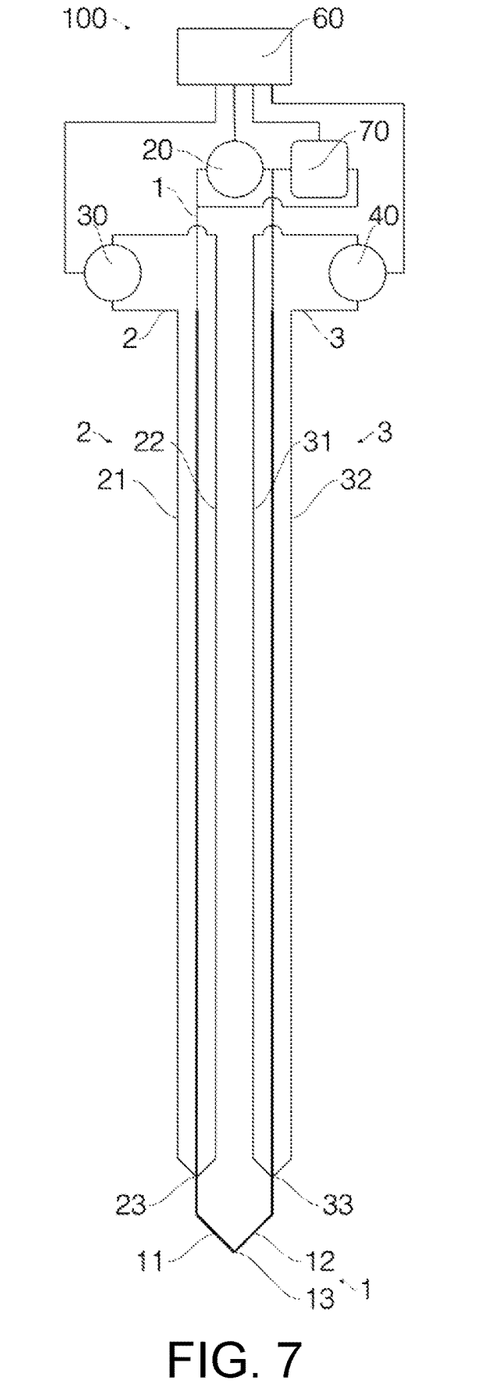
FIG. 7 is a schematic of a temperature measurement device of embodiment 5.

As seen in FIG. 7, the only difference between the temperature measurement device 100 in embodiment 5 and embodiment 3 is that the temperature measurement probe 10 no longer has a protection jacket 4 in embodiment 5, so there is no coolant flow passage. Compared with embodiment 3, the position of the second sensing junction 23 is the first position, and the position of the third sensing junction 33 is the second position. Therefore, the second measured temperature is the second temperature and the third measured temperature is the third temperature.

Similarly, in this embodiment, the control and algorithm unit 60 controls the current regulator 70 to open or close power supply to the first thermocouple 1 or adjust the current through the first thermocouple 1 to stimulate the first thermocouple 1 to change thermal equilibrium states.

Embodiment 6

Figure 8:
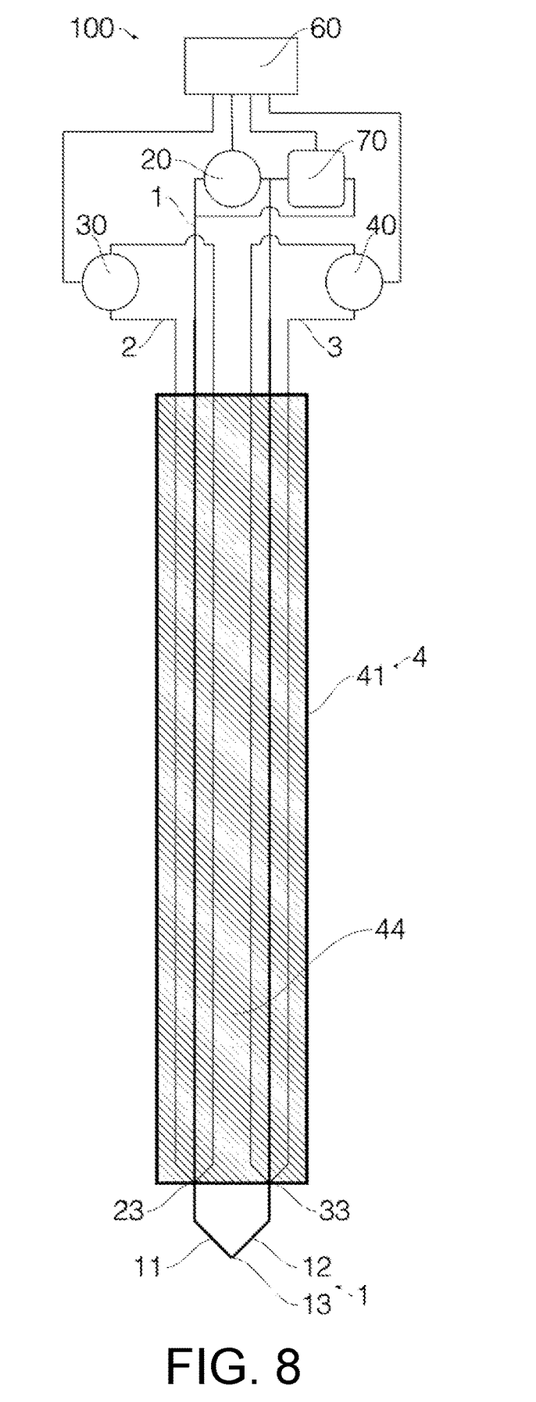
FIG. 8 is a schematic of a temperature measurement device of embodiment 6.

As seen in FIG. 8, the temperature measurement device 100 in embodiment 6 is different from the temperature measurement device 100 in embodiment 5 in that the temperature measurement probe 10 of the temperature measurement device 100 in embodiment 6 has a protection jacket 4. The protection jacket 4 is insulated from and fixedly connected to the first thermocouple 1 and surrounds the first thermocouple 1, the second thermocouple 2, and the third thermocouple 3. The first sensing junction 13 projects beyond the first end of the protection jacket 4. The protection jacket 4 comprises the housing 41 and the filling 44 inside the housing 41. The first thermocouple 1, the second thermocouple 2, and the third thermocouple 3 are embedded in the filling 44. The second sensing junction 23 and the third sensing junction 33 are located on the face of the first end of the protection jacket 4. Compared with embodiment 5, since the protection jacket 4 is added and the filling 44 fills the housing 41, the first thermocouple 1, the second thermocouple 2, and the third thermocouple 3 can be better protected, and the service life of the temperature measurement device 100 is improved.

In embodiments 2 to 6, except that the methods of stimulating the first thermocouple 1 to change thermal equilibrium states are different, the steps and effects of the temperature measurement method have no essential difference. Therefore, they are not repeated.

It can be seen from the above six embodiments that the technical schemes of the embodiments can improve the fluid temperature measurement accuracy in steady flow field and further allow the use of coolant to cool the main thermocouple. Therefore, accurate temperature measurement of high-temperature or ultra-high-temperature fluid can be realized without using noble metal thermocouples.

The description of the above specifications and embodiments is used to explain the scope of protection of this invention, but it is not construed as limitations on the scope of protection of this invention.

What is claimed is:

1. A temperature measurement method for a fluid in a steady flow field, the method comprising:

placing a first sensing junction of a first thermocouple into the fluid and obtaining a first temperature through a first instrument electrically connected to the first thermocouple, the first thermocouple having a first wire and a second wire joined to form the first sensing junction;

acquiring a second temperature at a first position on the first wire using a second thermocouple and a second instrument electrically connected to the second thermocouple; and acquiring a third temperature at a second position on the second wire using a third thermocouple and a third instrument electrically connected to the third thermocouple;

the first thermocouple being subjected to several different thermal equilibrium states during a temperature measurement; the first temperature, the second temperature, and the third temperatures being obtained in each thermal equilibrium state; a number of the thermal equilibrium states experienced during the temperature measurement being greater than or equal to a number of unknown variables in a variable set including a fluid temperature, an emissivity of the first wire, an emissivity of the second wire, an absorbed irradiation by the first wire, an absorbed irradiation by the second wire, a convection heat transfer coefficient between the first wire and the fluid, and a convection heat transfer coefficient between the second wire and the fluid;

the first wire between the first sensing junction and the first position being divided into at least two first elements along its extension direction; the second wire between the first sensing junction and the second position being divided into at least two second elements along its extension direction; energy conservation equations being established for the first sensing junction and all first and second elements in each thermal equilibrium state; and all energy conservation equations of all thermal equilibrium states being solved together to obtain the fluid temperature.

2. The temperature measurement method according to claim 1, wherein a method of stimulating the first thermocouple to change thermal equilibrium states is any one or any combination of a first stimulation method, a second stimulation method, a third stimulation method, a fourth stimulation method, and a fifth stimulation method; the first stimulation method being to apply an electric current to the first thermocouple; the second stimulation method being to change a current magnitude through the first thermocouple; the third stimulation method being to cool the first thermocouple with a coolant flow; the fourth stimulation method being to change an inlet temperature of the coolant flow used to cool the first thermocouple; and the fifth stimulation method being to change a flow rate of the coolant flow used to cool the first thermocouple.

3. The temperature measurement method according to claim 1, wherein under conditions that a diameter of the first wire and a diameter of the second wire are equal, that a length of the first elements are the same, and that a length of the second elements are the same, the energy conservation equation of the first sensing junction is $$KA_p(i)\frac{\pi d^2}{4}\frac{TA_p(i)-Tw_p}{\frac{\Delta x}{2}} + KB_p(j)\frac{\pi d^2}{4}\frac{TB_p(j)-Tw_p}{\frac{\Delta y}{2}} = 0$$

where $i = 1$ and $j = 1$;

the energy conservation equations of the first elements including at least an energy conservation equation of the first element adjacent to the first sensing junction and an energy conservation equation of the first element adjacent to the first position, the energy conservation equations of the first elements also including energy conservation equations of other first elements when the number of the first elements is more than two, the energy conservation equation of the first element adjacent to the first sensing junction being $$KA_p(i)\frac{\pi d^2}{4}\frac{Tw_p-TA_p(i)}{\frac{\Delta x}{2}} + \frac{KA_p(i)+KA_p(i+1)}{2}\frac{\pi d^2}{4}\frac{TA_p(i+1)-TA_p(i)}{\Delta x} +$$
$$h_A\pi d\Delta x(Tf-TA_p(i)) + \pi d\Delta x\left(\alpha_A G - \varepsilon_A \sigma TA_p(i)^4\right) + I_p^2 RA_p(i) = 0$$

where $i = 1$;

the energy conservation equation of the first element adjacent to the first position being $$\frac{KA_p(i)+KA_p(i-1)}{2}\frac{\pi d^2}{4}\frac{TA_p(i-1)-TA_p(i)}{\Delta x} + KA_p(i)\frac{\pi d^2}{4}\frac{TA_p-TA_p(i)}{\frac{\Delta x}{2}} +$$
$$h_A\pi d\Delta x(Tf-TA_p(i)) + \pi d\Delta x\left(\alpha_A G - \varepsilon_A \sigma TA_p(i)^4\right) + I_p^2 RA_p(i) = 0$$

where $i = m$;

the energy conservation equations of other first elements being $$\frac{KA_p(i)+KA_p(i-1)}{2}\frac{\pi d^2}{4}\frac{TA_p(i-1)-TA_p(i)}{\Delta x} +$$
$$\frac{KA_p(i)+KA_p(i+1)}{2}\frac{\pi d^2}{4}\frac{TA_p(i+1)-TA_p(i)}{\Delta x} +$$
$$h_A\pi d\Delta x(Tf-TA_p(i)) + \pi d\Delta x\left(\alpha_A G - \varepsilon_A \sigma TA_p(i)^4\right) + I_p^2 RA_p(i) = 0$$

where $i = 2, 3, \ldots, m-1$;

the energy conservation equations of the second elements including at least an energy conservation equation of the second element adjacent to the first sensing junction and an energy conservation equation of the second element adjacent to the second position, the energy conservation equations of the second elements also including energy conservation equations of other second elements when the number of the second elements is more than two, the energy conservation equation of the second element adjacent to the first sensing junction being $$KB_p(j)\frac{\pi d^2}{4}\frac{Tw_p-TB_p(j)}{\frac{\Delta y}{2}} +$$
$$\frac{KB_p(j)+KB_p(j+1)}{2}\frac{\pi d^2}{4}\frac{TB_p(j+1)-TB_p(j)}{\Delta y} +$$
$$h_B\pi d\Delta y(Tf-TB_p(j)) + \pi d\Delta y\left(\alpha_B G - \varepsilon_B \sigma TB_p(j)^4\right) + I_p^2 RB_p(j) = 0$$

where $j = 1$;

the energy conservation equation of the second element adjacent to the second position being $$\frac{KB_p(j)+KB_p(j-1)}{2}\frac{\pi d^2}{4}\frac{TB_p(j-1)-TB_p(j)}{\Delta y} +$$
$$KB_p(j)\frac{\pi d^2}{4}\frac{TB_p-TB_p(j)}{\frac{\Delta y}{2}} + h_B\pi d\Delta y(Tf-TB_p(j)) +$$
$$\pi d\Delta y\left(\alpha_B G - \varepsilon_B \sigma TB_p(j)^4\right) + I_p^2 RB_p(j) = 0$$

where $j = n$;

the energy conservation equations of other second elements being $$\frac{KB_p(j)+KB_p(j-1)}{2}\frac{\pi d^2}{4}\frac{TB_p(j-1)-TB_p(j)}{\Delta y} +$$
$$\frac{KB_p(j)+KB_p(j+1)}{2}\frac{\pi d^2}{4}\frac{TB_p(j+1)-TB_p(j)}{\Delta y} +$$
$$h_B\pi d\Delta y(Tf-TB_p(j)) + \pi d\Delta y\left(\alpha_B G - \varepsilon_B \sigma TB_p(j)^4\right) + I_p^2 RB_p(j) = 0$$

where $j = 2, 3, \ldots, n-1$;

i being a serial number of the first elements which is a natural number from 1 to m, the closer it being to the first sensing junction, the smaller the i value being, m being the number of the first elements;

j being a serial number of the second elements which is a natural number from 1 to n, the closer it being to the first sensing junction, the smaller the j value being, n being the number of the second elements;

p being a serial number of the equilibrium states which is a natural number from 1 to q, q being a number of the thermal equilibrium states;

d being the diameter of the first wire;

$\Delta x$ being a length of each first element which is calculated by dividing a length $L_A$ between the first sensing junction and the first position by m;

$\Delta y$ being a length of each second element which is calculated by dividing a length $L_B$ between the first sensing junction and the second position by n;

$\sigma$ being a Stefan-Boltzmann constant;

Tf being the fluid temperature;

$\varepsilon_A$ being the emissivity of the first wire;

$\varepsilon_B$ being the emissivity of the second wire;

$\alpha_A G$ being the absorbed irradiation by the first wire;

$\alpha_B G$ being the absorbed irradiation by the second wire;

$h_A$ being the convection heat transfer coefficient between the first wire and the fluid;

$h_B$ being the convection heat transfer coefficient between the second wire and the fluid;

$Tw_p$ being a first temperature in the $p^{th}$ thermal equilibrium state;

$TA_p$ being a second temperature in the $p^{th}$ thermal equilibrium state;

$TB_p$ being a third temperature in the $p^{th}$ thermal equilibrium state;

$TA_p(i)$ being a temperature of the $i^{th}$ element in the $p^{th}$ thermal equilibrium state;

$TA_p(i-1)$ being a temperature of the first element adjacent to the $i^{th}$ first element and further away from the first position in the $p^{th}$ thermal equilibrium state;

$TA_p(i+1)$ being a temperature of the first element adjacent to the $i^{th}$ first element and further away from the first sensing junction in the $p^{th}$ thermal equilibrium state;

$TB_p(j)$ being a temperature of the $j^{th}$ second element in the $p^{th}$ thermal equilibrium state;

$TB_p(j-1)$ being a temperature of the second element adjacent to the $j^{th}$ second element and further away from the second position in the $p^{th}$ thermal equilibrium state;

$TB_p(j+1)$ being a temperature of the second element adjacent to the $j^{th}$ second element and further away from the first sensing junction in the $p^{th}$ thermal equilibrium state;

$KA_p(i)$ being a thermal conductivity of the $i^{th}$ first element in the $p^{th}$ thermal equilibrium state which is determined by the material of the first wire and is a known function of $TA_p(i)$;

$KA_p(i-1)$ being a thermal conductivity of the first element adjacent to the $i^{th}$ first element and further away from the first position in the $p^{th}$ thermal equilibrium state which is determined by the material of the first wire and is a known function of $TA_p(i-1)$;

$KA_p(i+1)$ being a thermal conductivity of the first element adjacent to the $i^{th}$ first element and further away from the first sensing junction in the $p^{th}$ thermal equilibrium state which is determined by the material of the first wire and is a known function of $TA_p(i+1)$;

$KB_p(j)$ being a thermal conductivity of the $j^{th}$ second element in the $p^{th}$ thermal equilibrium state which is determined by the material of the second wire and is a known function of $TB_p(j)$;

$KB_p(j-1)$ being a thermal conductivity of the second element adjacent to the $j^{th}$ second element and further away from the second position in the $p^{th}$ thermal equilibrium state which is determined by the material of the second wire and is a known function of $TB_p(j-1)$;

$KB_p(j+1)$ being a thermal conductivity of the second element adjacent to the $j^{th}$ second element and further away from the first sensing junction in the $p^{th}$ thermal equilibrium state which is determined by the material of the second wire and is a known function of $TB_p(j+1)$;

$I_p$ being the electric current through the first thermocouple in the $p^{th}$ thermal equilibrium state;

$RA_p(i)$ being an electric resistance of the $i^{th}$ first element in the $p^{th}$ thermal equilibrium state which is determined by the material of the first wire and is a known function of $TA_p(1)$; and $RB_p(j)$ being an electric resistance of the $j^{th}$ second element in the $p^{th}$ thermal equilibrium state which is determined by the material of the second wire and is a known function of $TB_p(j)$.

* * * * *